(12) United States Patent
Morikawa

(10) Patent No.: US 7,865,841 B2
(45) Date of Patent: Jan. 4, 2011

(54) INPUT/OUTPUT DEVICE, INPUT/OUTPUT METHOD, AND PROGRAM

(75) Inventor: Koji Morikawa, Kyoto (JP)

(73) Assignee: Panasonic Corporation, Osaka (JP)

( * ) Notice: Subject to any disclaimer, the term of this patent is extended or adjusted under 35 U.S.C. 154(b) by 810 days.

(21) Appl. No.: 11/794,395

(22) PCT Filed: Nov. 16, 2006

(86) PCT No.: PCT/JP2006/022841

§ 371 (c)(1), (2), (4) Date: Jun. 28, 2007

(87) PCT Pub. No.: WO2007/063714

PCT Pub. Date: Jun. 7, 2007

(65) Prior Publication Data

US 2008/0005700 A1    Jan. 3, 2008

(30) Foreign Application Priority Data

Nov. 29, 2005   (JP)   ............................... 2005-343242

(51) Int. Cl.
G06F 3/048 (2006.01)
G06F 3/00 (2006.01)
G06F 15/18 (2006.01)

(52) U.S. Cl. .................... 715/811; 715/707; 715/744; 715/745; 715/825; 715/866; 706/14

(58) Field of Classification Search ............... 715/811, 715/825, 707, 866, 744, 745, 864; 706/11, 706/14, 47, 46
See application file for complete search history.

(56) References Cited

U.S. PATENT DOCUMENTS 4,862,498 A * 8/1989 Reed .................... 379/355.09

(Continued)

FOREIGN PATENT DOCUMENTS

EP   1 282 051   2/2003

(Continued)

OTHER PUBLICATIONS

International Preliminary Report on Patentability issued Jun. 12, 2008 in International (PCT) Application No. PCT/JP2006/322841.

Primary Examiner—Tadeese Hailu
Assistant Examiner—Nicholas S Ulrich
(74) Attorney, Agent, or Firm—Wenderoth, Lind & Ponack, L.L.P.

(57) ABSTRACT

An input/output device enables a system to adapt its operation to the user's learning the system without interfering with what the user has already learned about operating the system. In an input/output device enabling a system to adapt to how frequently the user uses particular functions, a storage unit 12 accumulates information about the operations the user performs, a user learning evaluation unit 13 determines if the user has learned each function based on the input operation history accumulated by the storage unit 12, and a menu display position adjustment unit 14 leaves the menu display position unchanged for any function the user learning evaluation unit 13 determines the user has learned, and rearranges the menu display positions of only those functions the user learning evaluation unit 13 determines the user has not learned in descending order of the frequency of execution based on the input operation history stored by the storage unit 12.

10 Claims, 11 Drawing Sheets

U.S. PATENT DOCUMENTS

| | | | | |
|---|---|---|---|---|
| 5,125,071 A | * | 6/1992 | Ozeki | 715/811 |
| 5,396,264 A | * | 3/1995 | Falcone et al. | 715/811 |
| 5,420,975 A | * | 5/1995 | Blades et al. | 715/811 |
| 5,535,321 A | * | 7/1996 | Massaro et al. | 715/707 |
| 5,821,936 A | * | 10/1998 | Shaffer et al. | 715/810 |
| 6,266,060 B1 | * | 7/2001 | Roth | 715/853 |
| 6,400,996 B1 | * | 6/2002 | Hoffberg et al. | 700/83 |
| 6,828,992 B1 | * | 12/2004 | Freeman et al. | 715/810 |
| 7,322,012 B2 | * | 1/2008 | Ishii | 715/811 |
| 7,526,735 B2 | * | 4/2009 | Fischer et al. | 715/825 |
| 7,543,244 B2 | * | 6/2009 | Matthews et al. | 715/811 |
| 7,584,436 B2 | * | 9/2009 | Hirasaka | 715/811 |
| 7,620,894 B1 | * | 11/2009 | Kahn | 715/707 |
| 7,730,421 B2 | * | 6/2010 | Kuenzner | 715/811 |
| 2002/0075320 A1 | * | 6/2002 | Kurapati | 345/811 |
| 2002/0180804 A1 | * | 12/2002 | Ishii | 345/811 |
| 2004/0053605 A1 | | 3/2004 | Martyn et al. | |
| 2004/0100505 A1 | * | 5/2004 | Cazier | 345/811 |
| 2005/0125743 A1 | * | 6/2005 | Beaton et al. | 715/811 |
| 2010/0011321 A1 | * | 1/2010 | Nakayama | 715/811 |

FOREIGN PATENT DOCUMENTS

| | | |
|---|---|---|
| JP | 5-113863 | 5/1993 |
| JP | 8-297555 | 11/1996 |
| JP | 9-128189 | 5/1997 |
| JP | 9-292967 | 11/1997 |
| JP | 2003-70075 | 3/2003 |
| JP | 2003-233731 | 8/2003 |
| JP | 2004-505369 | 2/2004 |

* cited by examiner

| ITEM NO. | FUNCTION | RATIO (%) | |
| --- | --- | --- | --- |
| | | USER A | USER B |
| ITEM 1 | [1] INBOX | 30 | 50 |
| ITEM 2 | [2] SEND | 20 | 0 |
| ITEM 3 | [3] SAVED MAIL | 20 | 40 |
| ITEM 4 | [4] NEW MESSAGE | 25 | 0 |
| ITEM 5 | [5] CHAT | 5 | 0 |
| ITEM 6 | [6] TEXT MESSAGE | 0 | 0 |
| ITEM 7 | [7] MAIL SERVER | 0 | 7 |
| ITEM 8 | [8] TEMPLATES | 0 | 3 |

Fig.8

| MENU POSITION 41 | INITIAL ITEM ORDER 42 | NO. TIMES USED 43 | LEARNING RESULT 44 | REVISION A 45 | REVISION B 46 |
|---|---|---|---|---|---|
| 1 | [1] INBOX | 50 | LEARNED | [1] INBOX | [1] INBOX |
| 2 | [2] SEND | 0 | NOT LEARNED | [2] MAIL SERVER | [2] SAVED MAIL |
| 3 | [3] SAVED MAIL | 40 | LEARNED | [3] SAVED MAIL | [3] MAIL SERVER |
| 4 | [4] NEW MESSAGE | 0 | NOT LEARNED | [4] TEMPLATES | [4] TEMPLATES |
| 5 | [5] CHAT | 0 | NOT LEARNED | ▽ | ▽ |
| 6 | [6] TEXT MESSAGE | 7 | NOT LEARNED | | |
| 7 | [7] MAIL SERVER | 7 | NOT LEARNED | | |
| 8 | [8] TEMPLATES | 3 | NOT LEARNED | | |

Fig. 11

| ITEM NO. 51 | USER A | | | USER B | | |
|---|---|---|---|---|---|---|
| | OPERATING INTERVAL (sec.) 52 | LEARNING RESULT 53 | REVISE MENU 54 | OPERATING INTERVAL (sec.) 55 | LEARNING RESULT 56 | REVISE MENU 57 |
| ITEM 1 | 0.5 | LEARNED | NO | 0.3 | LEARNED | NO |
| ITEM 2 | 0.7 | LEARNING | YES | — | NOT LEARNED | YES |
| ITEM 3 | 0.4 | LEARNED | NO | 0.5 | LEARNED | NO |
| ITEM 4 | 0.6 | LEARNED | NO | — | NOT LEARNED | YES |
| ITEM 5 | 1.0 | LEARNING | YES | — | NOT LEARNED | YES |
| ITEM 6 | — | NOT LEARNED | YES | — | NOT LEARNED | YES |
| ITEM 7 | — | NOT LEARNED | YES | 0.9 | LEARNING | YES |
| ITEM 8 | — | NOT LEARNED | YES | — | NOT LEARNED | YES |

INPUT/OUTPUT DEVICE, INPUT/OUTPUT METHOD, AND PROGRAM

BACKGROUND OF THE INVENTION

1. Field of Invention

The present invention relates to an input/output device that improves the operability of a device by adapting the device to user operations as a user operates a device such as an information device or an audio/visual device.

2. Description of Related Art

The number of features and functions provided by information devices to users has increased as the performance of the information devices has improved. In addition to the primary function of providing wireless mobile telephone service, modern cell phones, for example, offer digital camera functions for taking pictures, text messaging and e-mail functions, so-called "wallet phone" functions for paying fees and fares, and even Internet browser capabilities. When so many functions are provided in cell phones and other devices of such a small, limited size, the user must typically perform a confusingly complicated series of steps in order to access the desired function. As software features and functions continue to increase, even personal computer users find it increasingly difficult to access the desired function in a full-featured word processing program, for example.

Devices that adjust the operations executed by the device according to the requests and actions performed by the user are one possible solution for this problem. Generally referred to as adaptive input/output devices, these devices gather information about how the user has operated the device and adjust the operating method and operating menu content to the way the user operates the device. An adaptive I/O device as known from the literature is described below.

Japanese Unexamined Patent Appl. Pub. JP-A-H05-113863, for example, teaches a preferred menu display method that preferentially displays the menu items most frequently accessed by the user based on the operator's usage history when there are too many menu items to display at once. This reduces the number of available menu selections at any one time and thus makes it easier for the user to find and select the menu items most commonly invoked by the user.

Different kinds of information can be used to modify the order of the preferred display items. The adaptive operation support device taught in Japanese Unexamined Patent Appl. Pub. JP-A-2003-70075, for example, refers to as much user information as possible in order to simplify menu selection when finding the desired menu item is particularly difficult for the user. For example, in order to select a function for one of multiple devices in the home that can be controlled with a universal control device, the menus and items are adaptively displayed based on how the user has operated the devices in the past, the time of day, the ambient temperature and other environmental information used to control the air conditioner, for example, and whether high priority events, such as the phone ringing, have occurred.

Determining the order of precedence is also not always based on user convenience alone. Japanese Unexamined Patent Appl. Pub. JP-A-2003-233731, for example, teaches giving greater precedence to search results related to a paid advertiser when ranking the order in which Internet search results are presented. This method enables linking the user to a particular advertiser when an information search gets multiple results and the results cannot be reduced to a single selection.

Japanese Unexamined Patent Appl. Pub. JP-T-2004-505369 teaches a method of displaying selected items after calculating the order of precedence using various methods. The menu improvement method taught in JP-T-2004-505369 displays the highest priority items in the center of the menu list to minimize the cursor movement required to select a desired item and thereby make menu selection easier for the user. This is particularly useful on cell phones and similar devices with a small screen where function selection requires moving a cursor and pressing a button to enter the selection.

When numerous functions can be offered to the user, such adaptive I/O devices can thus enable the user to select a required function without viewing all available menu items by reducing the functions presented to the user based on user information.

One of the problems with the adaptive I/O devices of the related art is due to the user remembering and becoming accustomed to device operations. When a user uses a device for the first time, the adaptive I/O device of the related art cannot adapt operation to the user because it does not know how frequently the user accesses any functions. As a result, the default standard function selection method and menu display sequence of the device must be used while gradually learning what functions the user selects in what conditions. However, during the initial learning stages in which the device is learning what functions the user accesses, the user is also learning and remembering what functions the device provides and how to operate the device. The user is thus both using and learning how to operate the device at the same time.

As a user operates the device without the displays being adjusted, the user gradually remembers the device operations and how to operate the device and within a certain period of time learns to operate the device according to the default operating system of the device. Note that this operating system as used herein refers to the display content of the menus that are a listing of the executable functions, the number of items displayed, and the order in which the menus and items are displayed. Once the user has memorized the operating sequence, the user can operate the device without looking at and reading the menus because device operation has become rote. The user can thus operate the device without paying particular attention to the displayed menus and available selections.

When the user operates a device with the ability to adjust where menu items are displayed, however, and the device begins to respond adaptively to the user once the user has become accustomed to device operation, the user is forced to relearn where the menu items are displayed. This forces the user to relearn operations that had become rote, and the burden of this need to recognize changing menus and relearn operations increases with the user's degree of familiarity with the device. Some advanced users of word processors and other personal computer programs even turn the adaptive menu display function off so that menu items are not removed or moved by the device. This method depends on the user to learn the device or program instead of expecting the system or program to adapt to the user. If an adaptive I/O device that is intended to assist the user functions at the wrong time and forces the user to relearn operations, the adaptive I/O device can actually impede rather than help learning. At the same time, however, functions that are seldom used and not memorized can be made easier to use by moving the corresponding menu items to a more efficient location.

The problem with the related art is therefore that uniformly implementing an adaptive display function does not uniformly improve the ease of use.

SUMMARY OF THE INVENTION

The input/output device of the invention improves device operability without interfering with user learning by enabling the user to perform familiar operations using the method familiar to the user while the device adjusts the display position of functions that are still unfamiliar to the user.

A first aspect of the invention is an input/output device for selecting an item displayed on screen through a sequence of operations and then executing a function corresponding to the selected item, the input/output device having: an input means that is operated by a user; a storage means for storing an input operation history of user operations input to the input means; a display position adjusting means for adjusting the display positions of items based on the input operation history stored in the storage means; an output means for outputting the items to the screen display positions adjusted by the display position adjusting means; and a user learning evaluation means for determining if the user has learned the selection sequence for items selected by the user based on the input operation history stored in the storage means. The display position adjusting means prohibits changing the screen display position of items that the user learning evaluation means determines the user has learned, and adjusts the display position of items that the user learning evaluation means determines the user has not learned.

Preferably, the user learning evaluation means calculates from the input operation history stored in the storage means how many times the function of a selected item has been executed, determines that the user has learned any item for which the calculated function execution count is greater than or equal to a reference value, and determines that the user has not learned any item for which the calculated function execution count is less than the reference value.

Alternatively, the user learning evaluation means calculates from the input operation history stored in the storage means the ratio that the function of a selected item has been executed, determines that the user has learned any item for which the calculated function execution ratio is greater than or equal to a reference value, and determines that the user has not learned any item for which the calculated function execution ratio is less than the reference value.

In another aspect of the invention the user learning evaluation means detects from the input operation history stored in the storage means the type of buttons used to execute a function, determines that the user has learned any item for which the detected buttons include a numeric button, and determines that the user has not learned any item for which the detected buttons include the enter button.

In another aspect of the invention the user learning evaluation means calculates an operating time interval from the input operation history stored in the storage means, determines that the user has learned any item for which the calculated operating time interval is less than a reference value, and determines that the user has not learned any item for which the operating time interval is greater than or equal to the reference value.

In another aspect of the invention the user learning evaluation means calculates a display screen switching interval from the input operation history stored in the storage means, determines that the user has learned any item for which the calculated display screen switching interval is less than a reference value, and determines that the user has not learned any item for which the display screen switching interval is greater than or equal to the reference value.

In another aspect of the invention the user learning evaluation means adjusts the reference value according to the length of a message displayed on screen.

In another aspect of the invention the user learning evaluation means detects where the user is looking, determines that the user has not learned any item the user selects by looking at the screen, and determines that the user has learned any item the user selects by not looking at the screen.

In another aspect of the invention the user learning evaluation means determines that the user has not learned items for which the user's actions change when the screen display is changed, and determines that the user has learned items for which the user's actions did not change.

Yet further preferably, the display position adjusting means adjusts the display position of items that the user learning evaluation means determines the user has not learned by rearranging the display positions of the items in descending order of the frequency of execution based on the input operation history stored in the storage means.

Another aspect of the invention is an input/output method for selecting an item displayed on screen through a sequence of operations and then executing a function corresponding to the selected item, the input/output method having steps of: (a) a user performing an operation; (b) accumulating an input operation history of user operations performed in step (a); (c) determining for items selected by the user if the user has learned the selection sequence based on the input operation history stored in step (b); (d) prohibiting changing the screen display position of items that step (c) determines the user has learned, and adjusting the display position of items that step (c) determines the user has not learned based on the input operation history stored in step (b); and (e) outputting the items to the screen display positions adjusted in step (d).

A program according to a third aspect of the invention causes a computer to execute the input/output method of the invention.

The input/output device of the invention enables a device or system such as a cell phone or personal computer to adjust the on-screen display positions of functional items without changing the display position of functional items, such as menu items or icons, that the user has already remembered how to access and use. The system can therefore adjust the display positions of functions the user has not learned to improve efficiency and afford smooth operation while the user can continue to use the operating methods and sequences that the user has already learned without needing to relearn.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 8 shows an example of the e-mail function execution counts, learning evaluation results, and revised menus calculated from the user input history stored in the storage unit 12 shown in FIG. 1.

FIG. 11 shows an example of the e-mail function access intervals, learning evaluation results, and whether the menu display position can be changed based on the user input history stored in the storage unit 12 shown in FIG. 1.

DETAILED DESCRIPTION OF THE PREFERRED EMBODIMENTS

Preferred embodiments of the present invention are described below with reference to the accompanying figures.

Embodiment 1

Figure 1:
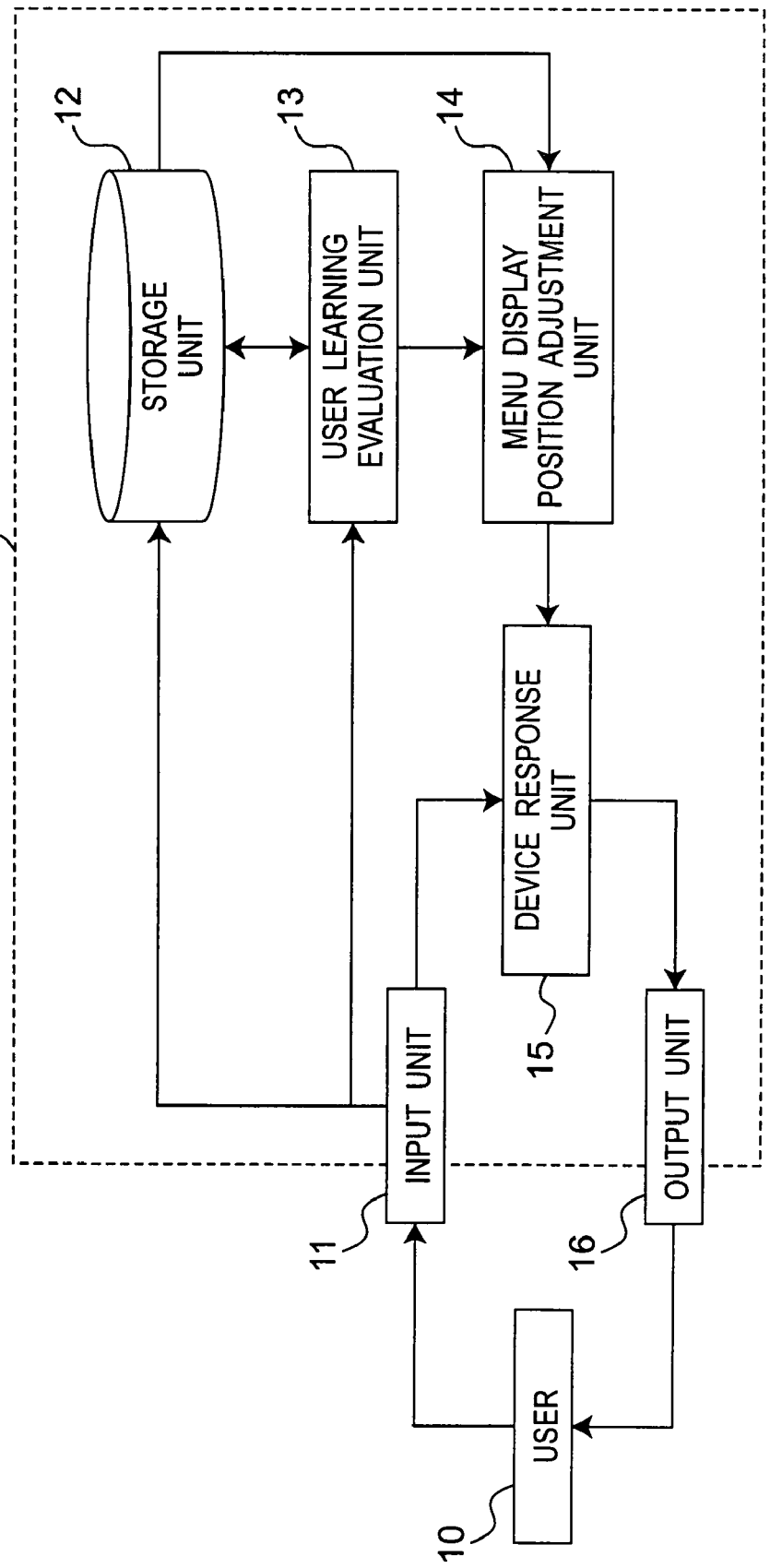
FIG. 1 shows the arrangement of an input/output device according to a first embodiment of the invention.

FIG. 1 shows the arrangement of an input/output device according to a first embodiment of the invention. Referring to FIG. 1, the user 10 operates the input unit 11 of the input/output (I/O) device 17, and the input unit 11 outputs input signals from the user 10 to the storage unit 12, the user learning evaluation unit 13, and the device response unit 15.

The storage unit 12 accumulates information about the input operations executed by the user 10, and outputs an input operation history to the user learning evaluation unit 13 and the menu display position adjustment unit 14.

Based on the input operation history from the storage unit 12, the user learning evaluation unit 13 determines which menu items have been learned by the user 10, and outputs the result to the menu display position adjustment unit 14.

Based on the input operation history of the user 10 received from the storage unit 12 and the evaluation results from the user learning evaluation unit 13, the menu display position adjustment unit 14 leaves the menu display position of any item learned by the user 10 unchanged, adjusts the menu display position of items not learned by the user 10, and outputs the result to the device response unit 15.

Based on input signals from the user 10 and the display position adjustment information from the menu display position adjustment unit 14, the device response unit 15 determines the response from the device to the user 10, outputs the result to the output unit 16, and the output unit 16 outputs data to the user 10 based on the result from the device response unit 15.

Figure 2:
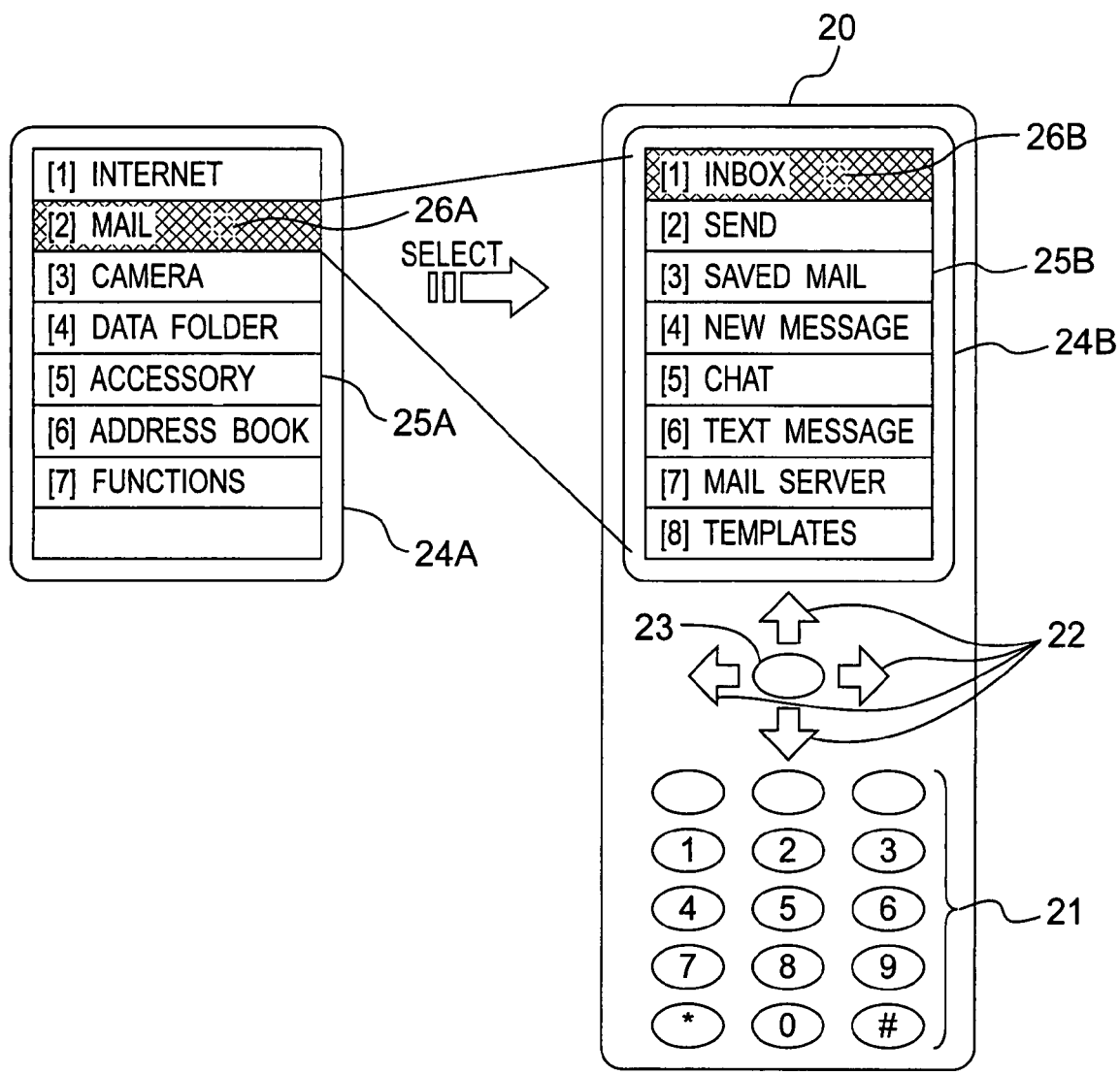
FIG. 2 is a front view showing an example of the input unit 11 and the output unit 16 of the I/O device 17 shown in FIG. 1.

The I/O device 17 is described further below using a cell phone by way of example as the I/O device 17 as shown in FIG. 2.

FIG. 2 is a front view showing an example of the input unit 11 and the output unit 16 of the I/O device 17 shown in FIG. 1. Different menus 25A, 25B can be displayed on the screen 24A, 24B of the cell phone 20. In FIG. 2 the top menu 25A is displayed in screen 24A, and the main categories of functions available on the cell phone 20 are displayed in the top menu 25A. The user 10 thus selects and executes functions from the menus 25A, 25B that are presented on the screen 24A, 24B in response to the user selecting a particular function or menu item. It is assumed below that the menu 25B for sending and receiving e-mail is currently displayed on the cell phone 20.

The numeric keypad 21, the cursor control buttons 22, and the enter button 23 of the cell phone 20 together render the input unit 11 of the arrangement shown in FIG. 1. The numeric keypad 21 is used to enter numbers and letters, and the cursor control buttons 22 are used to navigate the cursor and move the currently selected menu item. The screens 24A, 24B are equivalent to the output unit 16 in the arrangement shown in FIG. 1. The screen 24B in this example displays an e-mail function selection menu 25B, that is, a list of the available e-mail functions. The one function 26B that is displayed in a different color indicates the currently selected function 26B and the current location of the cursor. Pressing the enter button 23 causes the function corresponding to the item selected by the cursor to execute.

The currently selected function 26B in FIG. 2 is the [1] Inbox. Pressing the down arrow in the cursor control buttons 22 moves the cursor down to the next menu item. The item 26A, 26B that is currently selected is also referred to herein as the cursor position. Pressing the enter button 23 after moving the cursor position 26A, 26B to the desired menu item tells the cell phone 20 what function the user 10 wants to invoke. Pressing the enter button 23 from the cursor position shown in FIG. 2, for example, causes the e-mail inbox to be displayed.

How the user operates the cell phone 20, and how the cell phone 20 adapts to the user 10 learning cell phone 20 operations are described next.

There are two main ways for the user to select and invoke functions displayed in menus by the cell phone 20. One method is to use the cursor control buttons 22 to move the cursor position 26A, 26B up or down to select the desired function and then press the enter button 23. Another method is to use the numeric keypad 21 to enter the number of the menu item corresponding to the desired function to directly invoke the desired function. Each function shown in each menu is preceded by an index number ([1], [2], and so forth in this example), and pressing the same number on the numeric keypad 21 directly selects and invokes the corresponding function. Pressing 2 on the numeric keypad 21 from the menu shown in FIG. 2 moves directly to the Send mail screen, for example.

As the user 10 performs the same operations on the input/output device time and again, the user 10 gradually remembers how to operate the input/output device. To access the [3] Saved Messages mailbox using the cursor control buttons 22 and the enter button 23, for example, the user first presses the Down arrow key of the cursor control buttons 22 twice and then presses the enter button 23 once, thus pressing buttons three times. This method requires that the user 10 knows what function is selected by the cursor position 26A, 26B when pressing the cursor control buttons 22, but as this same function is accessed time and again, the sequence of operations becomes second nature and the user knows to press Down-Down-Enter without looking at the screen. As the user 10 remembers particular operating sequences as a result of repeatedly performing those operations frequently, the user 10 can perform those operations without particularly thinking of the individual steps, and the operation becomes second nature.

Another example of this is entering letters of the alphabet from a telephone keypad. To enter the letter "C", for example, the user presses the key labelled ABC three times. As the user becomes accustomed to this entry method, however, the user may automatically press the button three times consecutively and proceed to the next operation without verifying what is displayed on screen even if the user saw that the letter "C" was already displayed at the beginning of the operation.

As the user remembers button sequences, selecting and executing a function are processed as a single operating sequence. This situation is referred to herein as the user having learned or being trained in the operating system of the device. This indicates that the user can use a particular function without particularly thinking about the sequence of steps that is used.

The following problem can occur if the positions where the menu items are displayed on the cell phone, for example, can be adjusted, however. It is assumed that the cell phone 20 accumulates a history of user 10 operations similarly to the adaptive input/output device of the related art, and rearranges the menu items so that, for example, only the menu items that are frequently invoked by the user 10 are displayed in order from the top. If the user 10 accesses the Inbox most frequently and accesses the Saved Mail box second most frequently, and the menu items are rearranged in the order of frequency, the Saved Mail box will be moved from the third position to the second position. The number of times the Down arrow must be pressed to access the Saved Mail box could be reduced in this case, but changing the number of times the button must be pressed will prevent the user from using the operating method that has become second nature. If the user is accustomed to pressing Down-Down-Enter to access the Saved Mail box, for example, but the cell phone 20 has changed the display sequence of the functions, pressing Down-Down-Enter will access a different, unintended function. Because the user 10 can operate the cell phone 20 without paying particular attention to the menu structure once the user 10 has become familiar with its operation, the user 10 only notices the incorrect operation (=device-side adaptation) after the different function has been invoked. The user 10 typically perceives this automatic device-side adaptation as unwanted interference with the user's learning and unhelpful help. This prevents smooth operation.

The invention therefore retains the current operating sequence for device functions that the user 10 has already learned, and adjusts menu item display positions only to select and invoke functions that the user 10 has not yet memorized.

Figure 3:
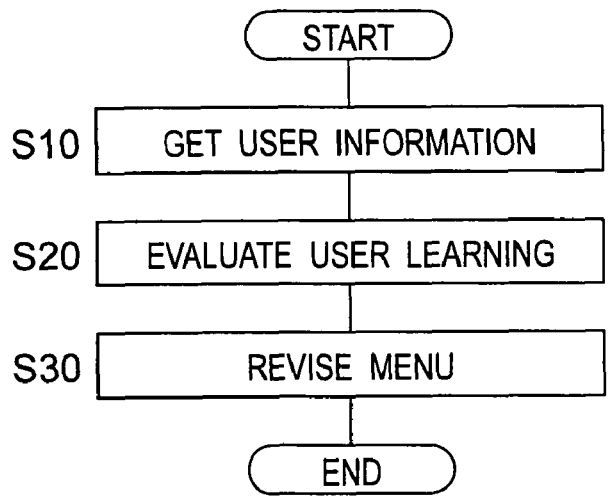
FIG. 3 is a flow chart of the main routine executed by the storage unit 12, the user learning evaluation unit 13, and the menu display position adjustment unit 14 shown in FIG. 1.

Processes executed by the input/output device according to this first embodiment of the invention are described next with reference to FIG. 3 to FIG. 8. FIG. 3 is a flow chart of the main routine executed by the storage unit 12, the user learning evaluation unit 13, and the menu display position adjustment unit 14 shown in FIG. 1.

Referring first to FIG. 3, the storage unit 12 collects information about the input operation history of the user 10 in step S10. In order to adjust the menu item display positions, it is necessary to know the preferences and usage pattern of the user 10 that uses the device, and the storage unit 12 therefore collects the user's operating history, that is, information about how much which functions are used. The services that can be adaptively provided to the user 10 are determined from this information.

In step S20 the user learning evaluation unit 13 determines what menu selections the user 10 has learned. More specifically, the user learning evaluation unit 13 determines which functions the user 10 has learned and can use without paying close attention to the menus, and which functions the user 10 has not used often and can only use by responding to choices displayed on screen. Step S20 executes after the user 10 has operated the device (cell phone 20) for some period of time. This is because when the device is new the user 10 is not trained in the use of any functions and is still learning how to use the functions. The timing at which this step S20 executes can be set to a prescribed number of days of use (which could be several days to several ten days depending on how frequently the device is used) after the user 10 purchases and starts to use a new device, or after a function has been used a certain number of times, for example. In any case, this timing is set to a time at which the user 10 can be assumed to be familiar with at least some device operations.

In step S30 the menu display position adjustment unit 14 adjusts the menu item display positions based on the results passed from step S20. More specifically, the display positions of menu items that the user 10 is determined to have learned are not changed, and the display positions of functions that the user 10 is determined to have not yet learned are adjusted. By thus adjusting the display position of menu items corresponding to device functions, the input/output device of the invention helps the user 10 access unfamiliar functions more quickly while not interfering with functions the user 10 has already learned.

The steps of the main routine are described in further detail below.

Figure 4:
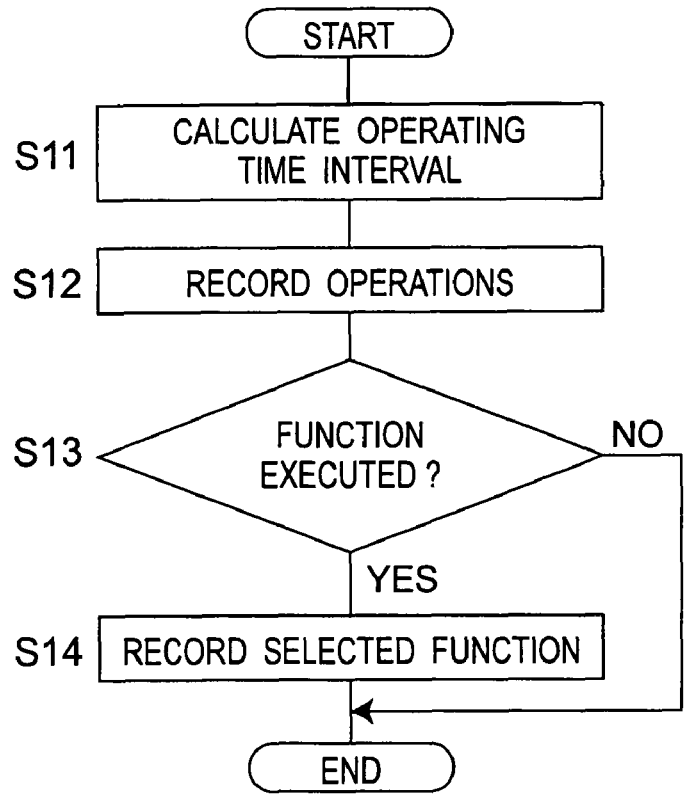
FIG. 4 is a flow chart of the user information collection process (step S10) shown in FIG. 3.

FIG. 4 is a flow chart of the user information collection process (step S10) shown in FIG. 3. This process is executed primarily by the storage unit 12.

Referring to FIG. 4, in step S11 a clock unit (not shown in the figure) inside the cell phone 20 determines how much time passes between each time the user 10 executes an input operation to the input unit 11. The storage unit 12 therefore has a counter function.

User operations in the case of the cell phone 20 used in this embodiment of the invention include pressing buttons on the numeric keypad 21, using the cursor control buttons 22, and pressing the enter button 23. In order to access the Mail 26A from the top menu 25A in FIG. 2 and then access the Saved Mail box 26B from the e-mail menu 25B, for example, the user 10 presses the enter button 23 at the top menu 25A and then presses the Down cursor control button 22, presses the Down cursor control button 22 again, and then presses the enter button 23. The operating intervals measured by the clock unit in this example are the time from when the enter key is pressed at the top menu 25A until the Down cursor key is pressed the first time at the e-mail menu 25B, the time from when the Down cursor key is pressed the first time at the e-mail menu 25B until the Down cursor key is pressed the second time, and the time from when the Down cursor key is pressed the second time until the Enter key is pressed the last time.

User operations could involve only moving the cursor position 26A, 26B without pressing Enter to invoke a function, and the operating time intervals are also calculated when only moving the cursor.

The operating interval tends to be longer when the user 10 must read and respond to menu choices, and becomes shorter as the user 10 becomes familiar with the operations. These operating intervals are therefore calculated in order to determine how familiar the user is with device operation, that is, the degree of training.

In step S12 the storage unit 12 stores the operating intervals calculated in step S11 together with the operations performed. In this aspect of the invention, the executed operation is recorded using the identifier ID of the key that was pressed if one of the keys in the numeric keypad 21 is pressed; the identifier ID of the cursor key that was pressed is recorded if one of the cursor control buttons 22 is pressed; and the identifier ID of the enter button 23 is recorded if the enter button 23 is pressed.

In step S13 the storage unit 12 determines if a command to execute the selected function was asserted. A function can be executed directly by pressing a key in the numeric keypad 21, or by pressing the enter button 23 to execute the function at the cursor position. If a function is executed in step S13, control goes to step S14 and the storage unit 12 stores the identifier ID of the executed function. For example, instead of simply storing as the recorded operation the fact that the enter button 23 was pressed, the storage unit 12 also stores the function ID of the "view inbox" function as the function that the user intended to execute by pressing the enter button 23. This results in the storage unit 12 storing a record of the function the user 10 wanted to access and the sequence of operations performed to execute the function. The time intervals between the individual operations can also be calculated at the same time by referencing the storage unit 12.

Figure 5:
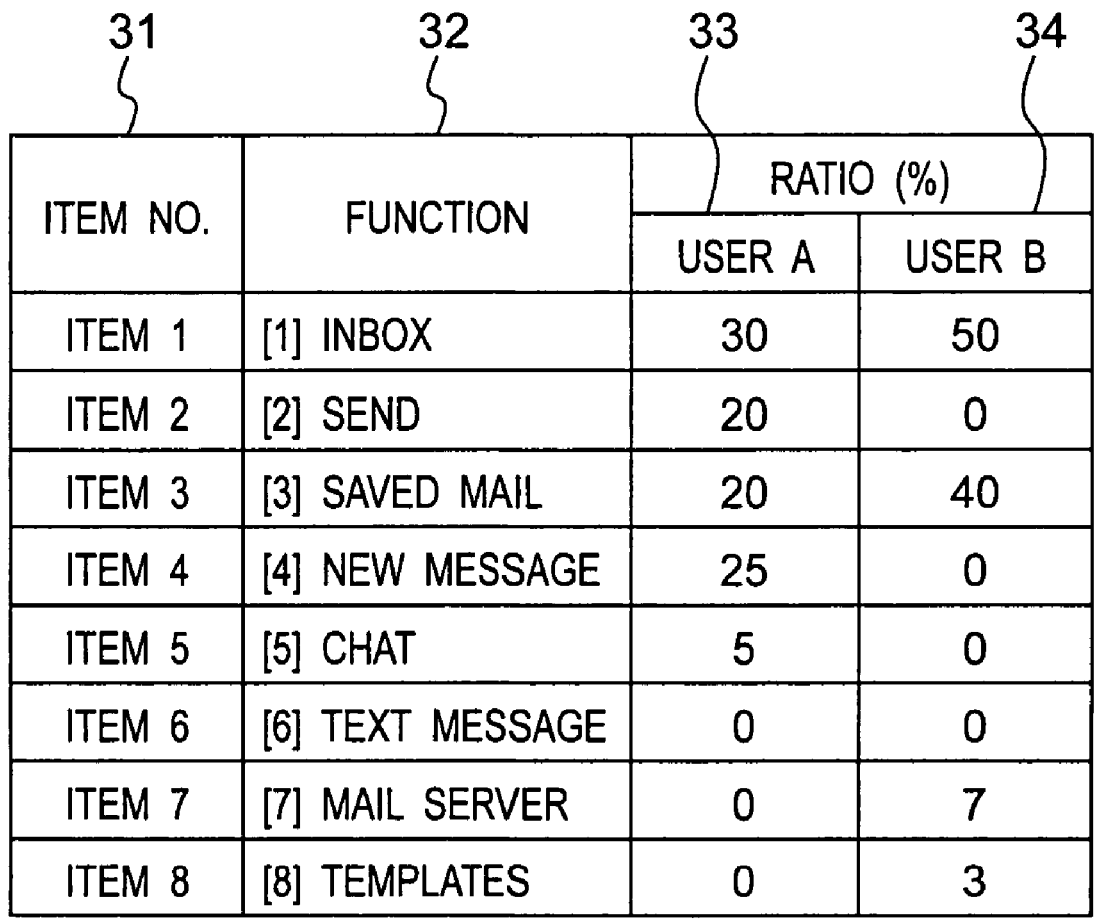
FIG. 5 shows an example of the execution rates calculated for e-mail functions from the user input history stored in the storage unit 12 shown in FIG. 1.

FIG. 5 shows an example of the e-mail function execution rates calculated from the input operation history of the user 10 stored in the storage unit 12 shown in FIG. 1. FIG. 5 shows which of the functions shown in the menu items 32 displayed in the e-mail function selection menu 25B were selected for how long within a prescribed period of time tabulated from the data in the storage unit 12 and expressed as a percentage. The selection rate for each function by user A is shown in column 33 and the selection rate for each function by user B is shown in column 34. User A in this example uses only menu items (functions) 1 through 5 as shown in column 33, while user B uses menu items 1, 3, 7, and 8 as shown in column 34. These differences in selection rates reflect differences in the pattern of cell phone usage by different users, and indicate that user A is someone that both sends and receives e-mail while user B is someone that only receives e-mail and does not send e-mail.

As these differences indicate, the best order of the menu items that are displayed for the user by the device differs according to the user, and this information is necessary to apply the invention to an individual device. It should be noted that the invention concerns using the information stored in this storage unit 12 in order to know which functions the user 10 has already learned, and not how information is acquired from the user 10 and applied to the user 10.

Figure 6:
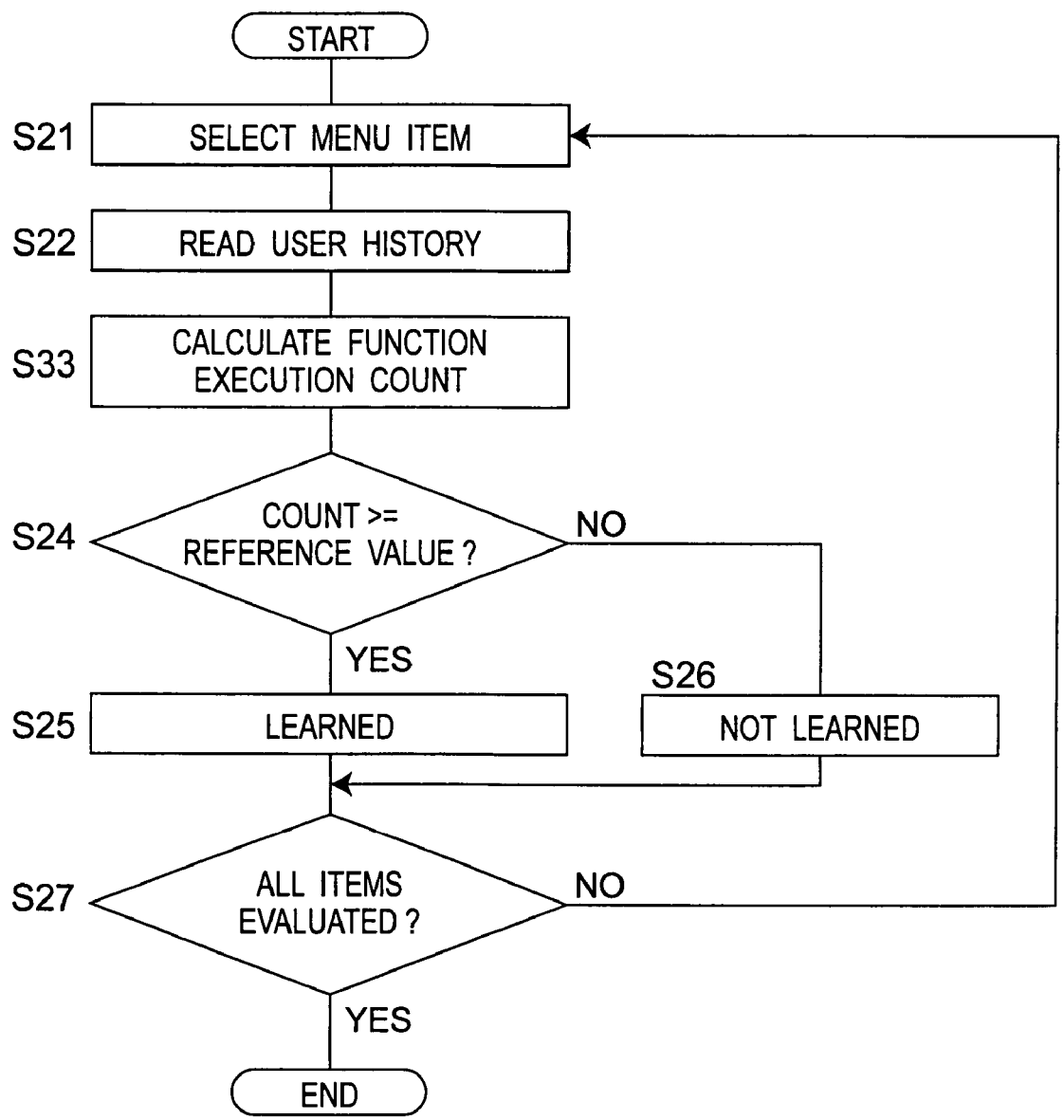
FIG. 6 is a flow chart of the user learning evaluation process (step S20) shown in FIG. 3.

FIG. 6 is a flow chart of the user learning evaluation process (step S20) shown in FIG. 3. This process is executed primarily by the user learning evaluation unit 13. The example shown in FIG. 6 determines whether the user has learned a function based on the number of times the user has used the function.

In step S21 the user learning evaluation unit 13 sequentially selects each menu item to be evaluated for user learning. Because whether the user 10 has learned a function is determined separately for each function, each of the menu items is sequentially selected and evaluated.

In step S22 the user learning evaluation unit 13 gets the input operation history of the user 10 for the function selected in step S21 from the storage unit 12.

Based on the input operation history of the user 10 retrieved in step S22, in step S23 the user learning evaluation unit 13 calculates how many times the function has been selected and executed to present.

In step S24 the user learning evaluation unit 13 determines if the function execution count, that is, the number of times the function was executed, calculated in step S23 is greater than or equal to a specific reference value. This reference value is the number of times the function must be executed in order to decide that the user has learned the function. The reference value could differ according to the complexity of the function, the operation required to execute the function, the frequency that the user selects the function, and user-specific factors, and is set to 10 in this embodiment of the invention by way of example only. Preferably, the average number of times the operation must be repeated in order learn a function is determined experimentally, and the reference value is set to this average.

If step S24 determines that the function execution count is greater than or equal to the reference value, control goes to step S25. In step S25 the user learning evaluation unit 13 determines that the user has executed the function a sufficient number of times to determine that the user 10 has sufficiently remembered how to use the function through repeated use, and therefore decides that the user 10 is trained in the use of that function. The result of this determination is then stored in the storage unit 12.

If the function execution count is less than the reference value in step S24, however, control goes to step S26. In step S26 the user learning evaluation unit 13 determines that the user has not used the function enough times to have learned the operation, and therefore determines that the user 10 is not trained in the use of that function. The result of this determination is also stored in the storage unit 12.

In step S27 the user learning evaluation unit 13 determines if it has determined whether the user 10 is trained in the use of all menu items. Control returns to step S21 and the process repeats until all menu items have been evaluated, and once all menu items have been evaluated the user learning evaluation process ends.

Figure 7:
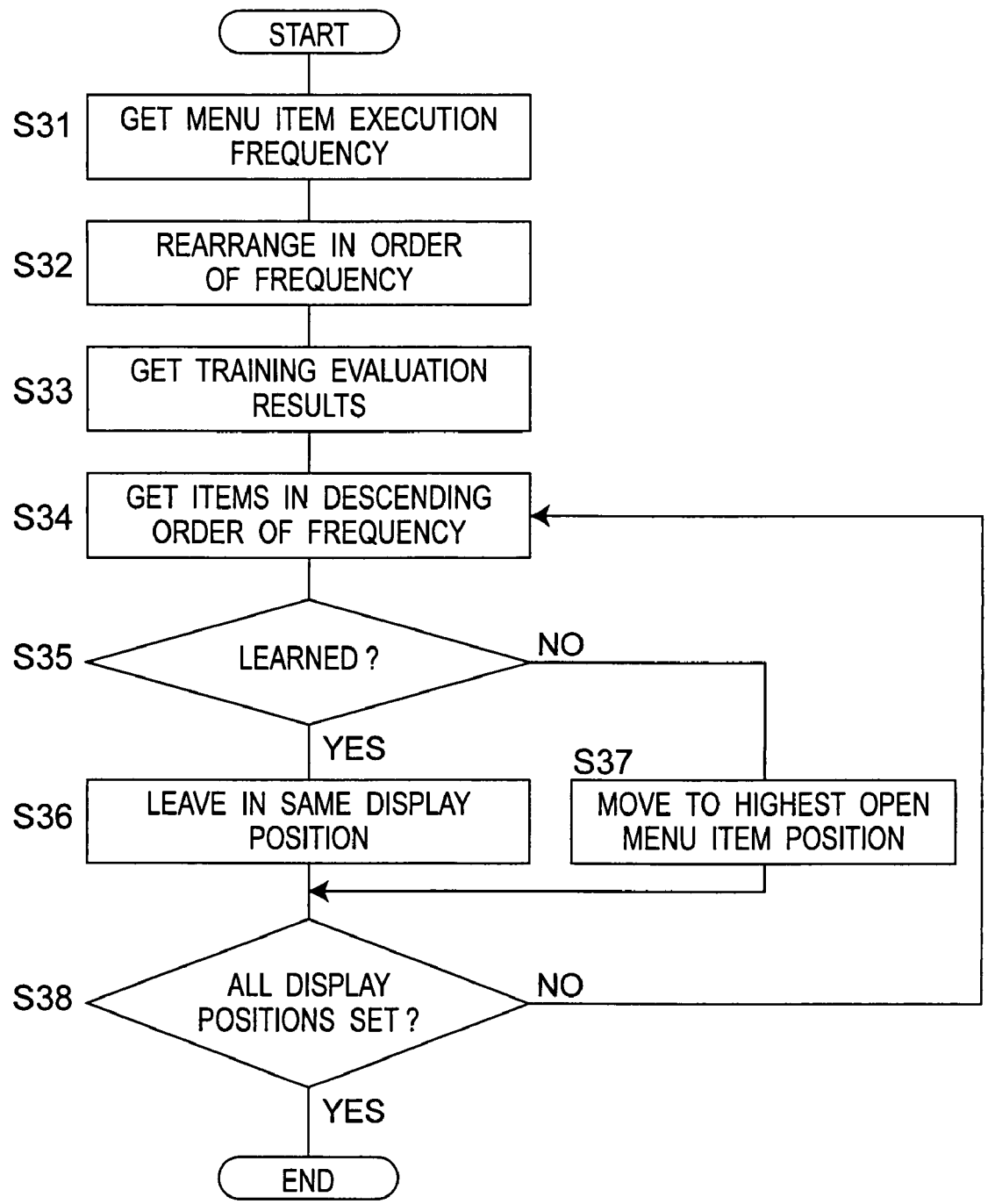
FIG. 7 is a flow chart of the menu revision process (step S30) shown in FIG. 3.

FIG. 7 is a flow chart of the menu revision process (step S30) shown in FIG. 3. This process is executed primarily by the menu display position adjustment unit 14. In step S31 in FIG. 7 the menu display position adjustment unit 14 starts the process by getting the execution frequency of each menu item from the input operation history of the user 10 stored in the storage unit 12. This execution frequency can be expressed as a percentage as shown in FIG. 5 or by simply using the execution count.

In step S32 the menu display position adjustment unit 14 rearranges the menu items in descending order based on the execution frequency acquired for each item in step S31. In the case of user B in FIG. 5, for example, the menu is rearranged from the top so that the first four items in descending order are items 1, 3, 7, and 8. Rearranging the menu according to the frequency of execution is completed in steps S31 and S32 so that the menu items (item positions) are set in the order of the most frequently executed items.

In step S33 the menu display position adjustment unit 14 gets the training evaluation results that were calculated in step S20 and saved to the storage unit 12. The sequence of steps S31 to S33 adds the training evaluation result to each of the menu items rearranged according to the frequency of execution.

In step S34 the menu display position adjustment unit 14 extracts the menu items rearranged according to the frequency of execution one by one from the top. Steps S35 to S38 then repeat until all menu items have been processed. In step S35 the menu display position adjustment unit 14 reads the training evaluation result acquired in step S33 for the menu item extracted in step S34 to determine if the user has learned that item. If the training evaluation result indicates that the user has learned that item, control goes to step S36. Because the first item in this example has been learned and the menu position is fixed, the menu display position adjustment unit 14 leaves the menu display position of the currently selected menu item in the same position.

If the user has not learned the selected menu item, control goes from step S35 to S37. Because the system decides in this case that the currently selected menu item can be moved, the menu display position adjustment unit 14 sets the menu display position of the currently selected item to the top open position in the menu. Because the items are selected from top to bottom in descending order of execution frequency, functions with a higher frequency of execution are set to high menu display positions by inserting the menu items to open menu positions from the top down. Steps S36 and S37 thus determine the new display position of each item in the menu.

In step S38 the menu display position adjustment unit 14 decides if the new menu display position has been decided for every menu item. If the position of each menu item has not been decided, control returns to step S34 and the loop repeats. If the position of each menu item has been decided, the menu revision process ends.

The menu revision process is described further below with reference to FIG. 8. FIG. 8 shows the execution count, the training evaluation result, and examples of the revised menus determined from the input operation history of the user 10 stored in the storage unit 12 in FIG. 1.

The menu is initially displayed with the items arranged in the order shown in column 42, and the user 10 initially accesses the menu items in this order to access the desired functions. The user's input operations are accumulated for a prescribed period of time or until reaching a predetermined count, at which point the cumulative frequency of execution of each function is as shown in column 43. While the device offers numerous features, the user 10 actually only uses a select few functions and never or only rarely uses the other functions. This is typical of many devices and programs that offer many functions. The training evaluation results shown in column 44 show the result of determining (in step S20 above) what functions the user 10 has learned based on the frequency of execution. In this example the functions of the frequently accessed menu items 1 and 3 have a high execution count indicating that the user has remembered how to use the function. The user is therefore considered to have learned these functions and their menu display positions are fixed.

Column 45 shows an example A of the revised order of the menu items based on the training evaluation results shown in column 44. Item 1 and item 3 are kept in the same position as the default order shown in column 42, the remaining items are selected in descending order of the frequency of execution (that is, item 7 and then item 8), and the selected items are assigned in order to the open menu positions from the top down (that is, to position 2 and then position 4). This enables the user 10 to continue using the operating sequences that the user has already memorized to access the most frequently used functions, such as pressing Down-Down-Enter to access the Saved Mail box, while changing the operating sequence but reducing the number of times the Down cursor arrow and Enter must be pressed to access less-frequently used features, such as Mail Server. In addition, if the user 10 uses the numeric keypad 21 to directly access menu items, this arrangement also prevents the user from needing to relearn the menu item number because learned functions are stored at the same menu display position accessed using the same number. In this example the Saved Mail box is kept at the same menu display position accessed by the number 3.

The revised menu B shown in column 46 is rearranged without using the training evaluation results acquired in step S20. In this case the menu item display positions are set in the descending order of the execution counts shown in column 43. In this case the method of accessing the Saved Mail box changes from the method that has become second nature to the user 10, and the user 10 must learn the new sequence. If the user 10 has learned the corresponding numbers for direct access from the keypad, the number has also changed and the user 10 must also relearn the new number.

In this first embodiment of the invention the user learning evaluation unit 13 determines if the user 10 has learned each of the menu items, leaves the items that the user 10 has learned in the same menu display position, and only adjusts the display position of items that the user 10 has not learned to assist the user. This enables the device to adapt the menu item display positions to the user without interfering with user 10 training, and thus enables the user 10 to operate the device more efficiently.

The operating intervals in this first embodiment of the invention are calculated from the time a key in the numeric keypad 21, one of the cursor control buttons 22, or the enter button 23 is pressed until the next button is pressed, but the invention is not so limited. More specifically, the operating interval could be the time between executing one function and executing the next function, or more specifically the time between when the enter button 23 is pressed to invoke one function and when the enter button 23 is pressed to invoke another function. The operating interval could alternatively be the time between switching from one menu to another menu. Referring to FIG. 2, this is the time between when the top menu 25A changes to the e-mail menu 25B and when the Saved Mail box is selected and the menu changes to the functions available in the Saved Mail box.

This first embodiment of the invention analyzes which of the e-mail functions are used and the ratio those functions are used for users A and B as shown in FIG. 5, but the invention is not so limited. More specifically, user information can be acquired from various perspectives based on the data in the storage unit 12, including how many times a function is used or how long an accessed function is used. The data can be analyzed and interpreted in many different ways, and different methods can be combined, in order to even more appropriately separate the menu items for which the menu display position is adjusted from the menu items that are not adjusted.

In this first embodiment of the invention the user learning evaluation unit 13 determines whether the user has learned a particular function in step S24 in FIG. 6 by comparing the number of times the function has been executed with a prescribed reference value, but the invention is not so limited. More specifically, the execution rate (%) of the function as shown in FIG. 5 could be compared with a prescribed reference value. Other means can also be used to determine if the user 10 has learned a particular function. Another training evaluation method that could be used by the user learning evaluation unit 13 is described below.

First Variation of the First Embodiment

Figure 9:
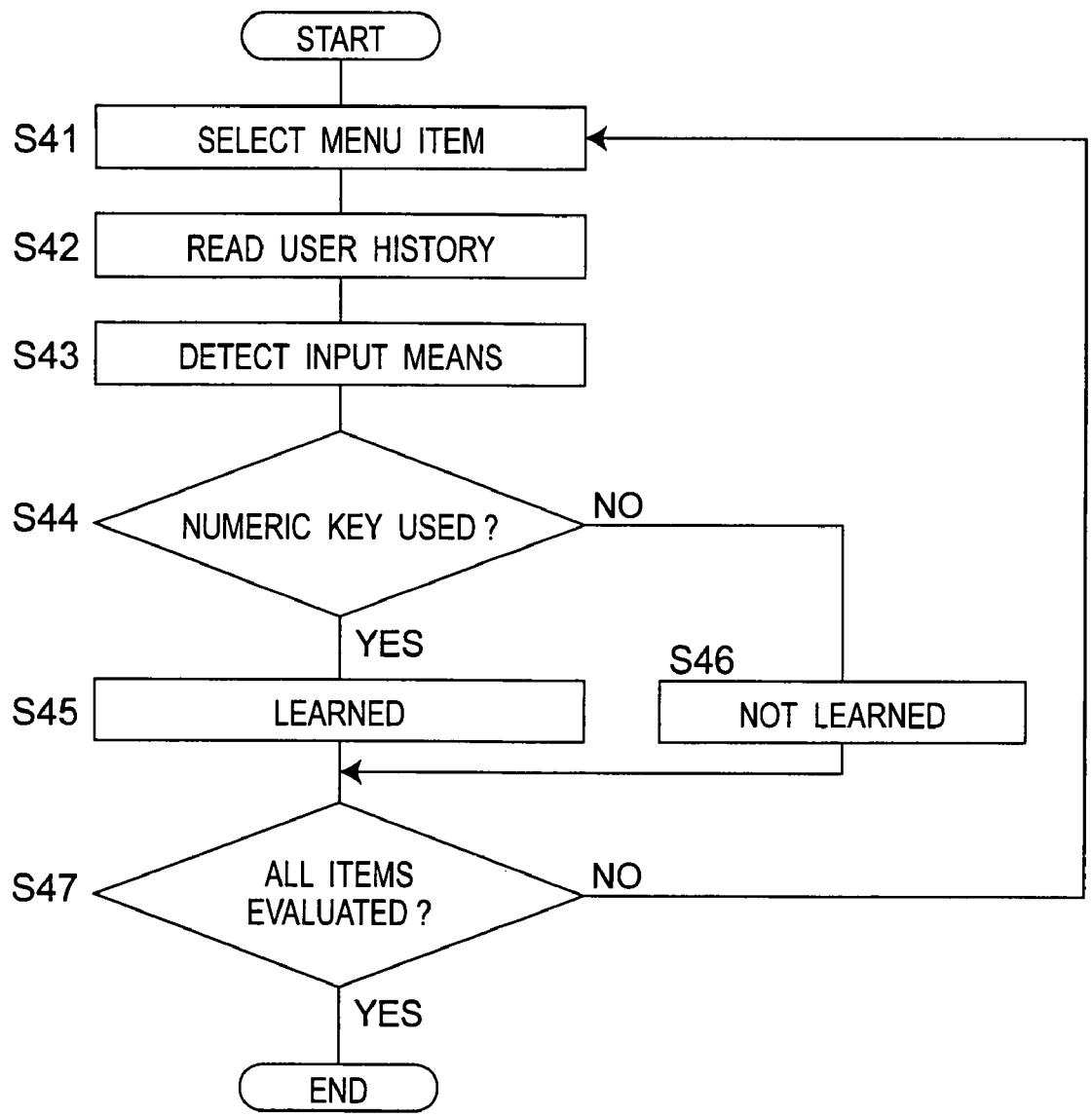
FIG. 9 is a flow chart of the user learning evaluation process (step S20) shown in FIG. 3 in a first variation of the first embodiment.

The input/output device according to this first variation of the first embodiment of the invention determines user 10 training based on an input means. FIG. 9 is a flow chart the user learning evaluation process (step S20) shown in FIG. 3 in this first variation of the first embodiment.

In FIG. 9 step S41, step S42, and step S47 are identical to step S21, step S22, and step S27, respectively, in FIG. 6, and further description thereof is omitted below.

In step S43 the user learning evaluation unit 13 detects from the user input operation history retrieved in step S42 what operations were used to access the currently selected function. Using the same example of a cell phone that was used in the first embodiment above, functions can be selected and invoked by (a) pressing a key on the numeric keypad 21, or (b) selecting the desired function with the cursor control buttons 22 and then pressing the enter button 23. Using the numeric keypad 21 enables directly selecting and executing a function and therefore offers the advantage of using fewer buttons to access a function. In addition, users commonly uses the cursor control buttons 22 and enter button 23 to select a function when first learning how to use cell phone, but later tend to use the numeric keypad 21 after becoming familiar with the operation. Therefore, if the user 10 initially uses the cursor control buttons 22 and enter button 23, the user 10 is determined to have learned the function once the user 10 uses the numeric keypad 21 to access the function. In step S43 the user learning evaluation unit 13 therefore detects which of these two input methods was used to select the current function.

In step S44 the user learning evaluation unit 13 determines whether the input means that was detected in step S43 as being used to select the function was the numeric keypad 21. If the numeric keypad 21 was used as the input means, control goes to step S45 and the user learning evaluation unit 13 determines that the user 10 is trained in that function. If the cursor control buttons 22 and enter button 23 were used as the input means, however, control goes to step S46 and the user learning evaluation unit 13 determines that the user 10 is not trained in that function. Whether or not the user has learned a function can thus be based on differences in the input means used to access the function.

Second Variation of the First Embodiment

Figure 10:
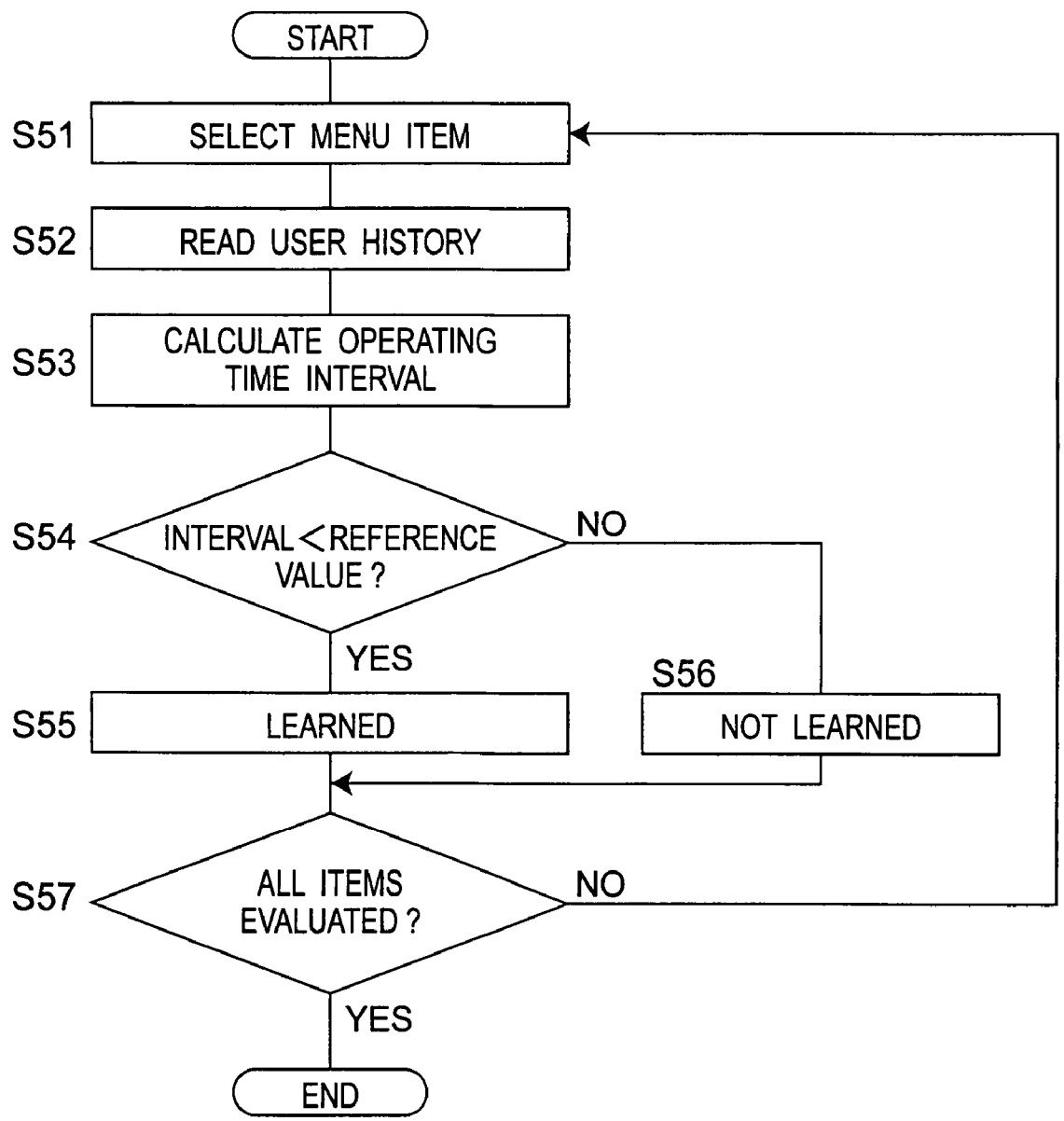
FIG. 10 is a flow chart of the user learning evaluation process (step S20) shown in FIG. 3 in a second variation of the first embodiment.

The input/output device according to this second variation of the first embodiment determines user 10 learning based on the operating time. FIG. 10 is a flow chart of the user learning evaluation process (step S20) shown in FIG. 3 in this second variation of the first embodiment.

In FIG. 10 step S51, step S52, and step S57 are identical to step S21, step S22, and step S27, respectively, in FIG. 6, and further description thereof is omitted below.

In step S53 the user learning evaluation unit 13 calculates the average operating time interval until the operation invoking the function is asserted based on the user input operation history retrieved in step S52. Calculating this operating time interval is described below with reference to FIG. 11.

In step S54 the user learning evaluation unit 13 determines if the operating time interval of the function calculated in step S53 is less than a specified reference value. This specified reference value is the operating time interval at which the user is determined to have learned the function. This reference time could be differ according to the complexity of the operation required to access a function, how frequently the user selects a function, and other user-specific parameters, and in this aspect of the invention is set to 0.7 second by way of example. More preferably, the average operating time interval after a function has been learned is determined experimentally and is used to set the reference value.

If in step S54 the operating time interval is less than the reference value, control goes to step S55. In step S55 the user learning evaluation unit 13 determines that the user 10 is sufficiently trained in the operation and has remembered the operating method because the desired function can be quickly accessed, and therefore determines that the user 10 is trained in the use of that function.

If in step S54 the operating time interval is greater than or equal to the reference value, control goes to step S56. In step S56 the user learning evaluation unit 13 determines that the user 10 has still not learned the operation and has not remembered the operating method because too much time is used to execute the next operation, and therefore determines that the user 10 is not trained in the use of that function. Evaluating whether the user has learned a function can thus be based on the length of time needed to access the function.

FIG. 11 shows an example of the e-mail function access intervals, learning evaluation results, and whether the menu display position can be changed based on the user input history stored in the storage unit 12 shown in FIG. 1.

In FIG. 11 column 52 shows the operating time interval in seconds when user A performs the operations for accessing the items shown in column 51.

When the operation for executing the current item 1 is a single operation executed after the operation invoking the previous menu item, the time from the previous operation to the operation invoking the current item 1 is the operating time interval of this operation invoking item 1.

When the operation for executing the current item 1 is a sequence of operations executed after the operation invoking the previous menu item, the operating time interval of the operation invoking item 1 is calculated as the average time of the individual operations performed to invoke the desired item 1. For example, if the three key operations, that is, Down cursor, Down cursor, Enter, are required to access item 1, the average time (t1+t2+t3)/3 is calculated as the operating time interval where t1 is the time from the previous operation to when the Down cursor key is pressed first, t2 is the time from when the Down cursor key was pressed the first time until when the Down cursor key was pressed the second time, and t3 is the time from when the Down cursor key was pressed the second time until when the Enter key was pressed. This enables using the same specific reference value to evaluate user training regardless of where the menu item is located.

The operating time interval calculated as described above generally becomes shorter as the user becomes more familiar with device operation, and becomes quite short when the user has reached the point of being able to operate the device without looking at the screen.

If the prescribed reference value in step S54 is set to 0.7 second, the learning evaluation result shown in column 53 is set to "trained" if the operating time interval is less than 0.7 second, and is set to "learning" if the operating time interval is greater than or equal to 0.7 second. Whether the menu display position can be changed (column 54) is then determined based on the learning evaluation results in column 53.

Column 55 likewise lists the operating time intervals of the operations used by user B to access each menu item in column 51, column 56 lists the learning evaluation results based on the operating time intervals in column 55, and whether the menu display position is changed is shown in column 57.

In this second variation of the first embodiment user learning is evaluated using the operating time interval, that is, the time between one operation and the next operation, but the invention is not so limited. The operating interval could alternatively be the time between switching from one menu to another menu. Referring to FIG. 2, this is the time between when the top menu 25A changes to the e-mail menu 25B and when the Saved Mail box is selected and the menu changes to the functions available in the Saved Mail box.

This second variation of the first embodiment of the invention evaluates user learning based on a predetermined reference value, but the invention is not so limited. Reference values can be set according to the time required to read a prompt, for example, and user learning can be evaluated using this reference value. For example, the time required to read and respond to "Send e-mail? [YES] [NO]" differs from the time required to read and respond to "The attached file is an executable. If a computer virus is contained in the attached file, your computer could become infected by running the attached file. Continue? [YES] [NO]." By adjusting the reference value to the length of the prompt, user learning can be evaluated more accurately.

In this second variation of the first embodiment of the invention the user learning evaluation unit 13 simply calculates the operating time interval as the time from the previous operation to the time of the current operation, but the invention is not so limited. More specifically, user learning can be evaluated using more dependable operating time interval information by, for example, discarding as unreliable data indicating an unusually long time interval resulting from the user daydreaming or talking with another person, for example, by using average of the operating time intervals for a particular function, or the average of a specific number of recent operations considering the learning process.

The user learning evaluation unit 13 can also evaluate user 10 learning from the number of times the cursor control buttons 22 are used or the interval between pressing the buttons. When the user operates the device while looking for the desired function, the operating interval of the cursor control buttons 22 increases and the cursor is moved more times. As a result, the user 10 can be determined to have learned a function when the number of times the cursor control buttons 22 are pressed is smallest or when the time between pressing one of the cursor control buttons 22 and pressing the enter button 23 is short.

Third Variation of the First Embodiment

An input/output device according to a third variation of the first embodiment evaluates user 10 learning based on the eye movements of the user 10, a type of information different from the input operations of the user 10.

The I/O device 17 in this aspect of the invention has an eye motion detector for detecting the eye movements of the user 10, and records the user's eye movements in the storage unit 12 together with the input operation history of the user 10. Eye movement can be detected using a device that is worn by the user, or by using a camera to image the eye and detect eye movements. In the case of a cell phone, the camera that is built in to many modern cell phones can be used to detect eye movements.

Figure 12:
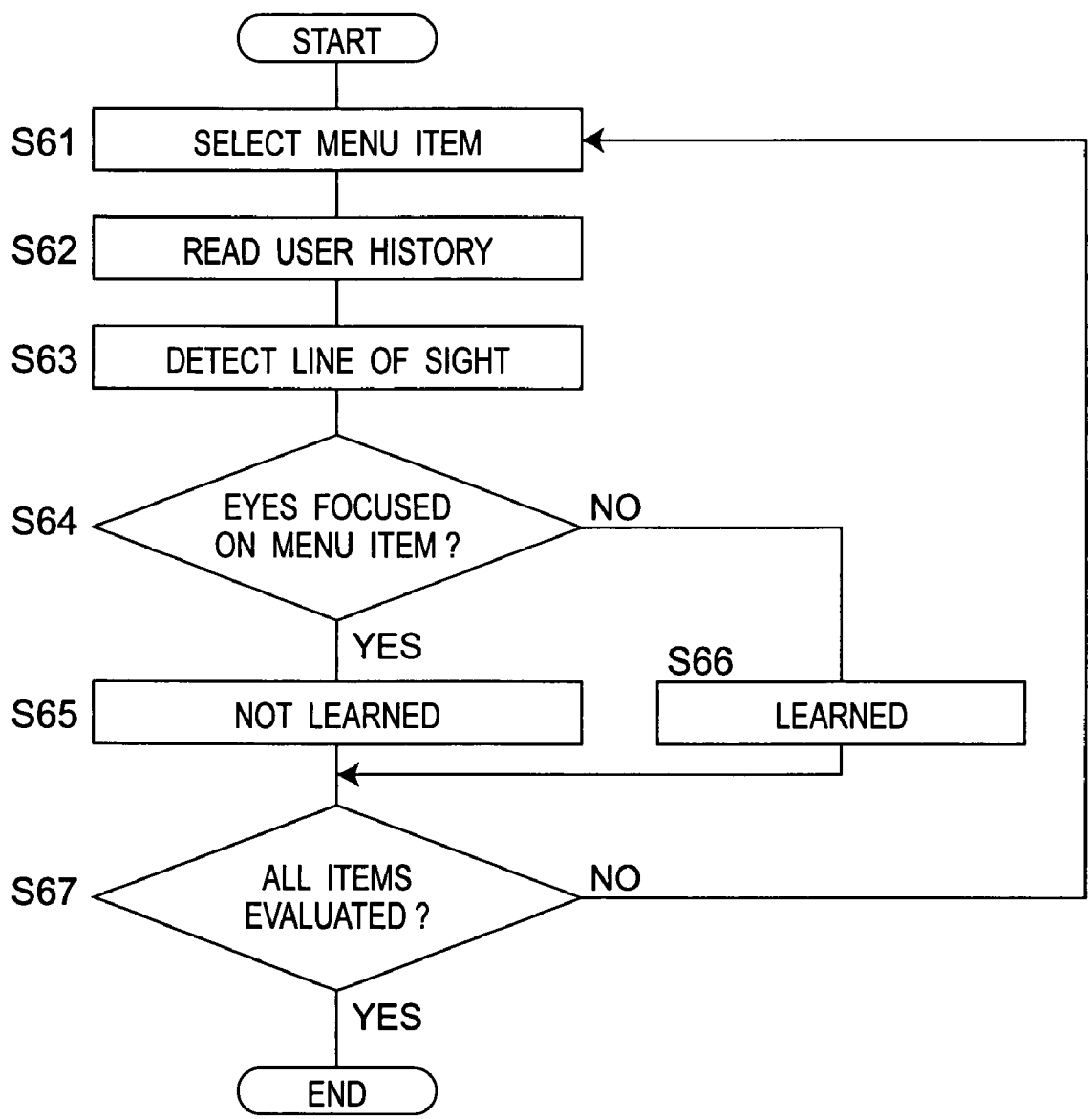
FIG. 12 is a flow chart of the user learning evaluation process (step S20) shown in FIG. 3 in a third variation of the first embodiment.

FIG. 12 is a flow chart of the user learning evaluation process (step S20) shown in FIG. 3 in a third variation of the first embodiment. In FIG. 12 step S61, step S62, and step S67 are identical to step S21, step S22, and step S27, respectively, in FIG. 6, and further description thereof is omitted below.

In step S63 the user learning evaluation unit 13 detects from the user input operation history and the history of eye movements retrieved in step S42 where the user 10 was looking when accessing the currently selected function.

In step S64 the user learning evaluation unit 13 determines if the focal point of the eyes detected in step S63 when the function was invoked was on the menu item that was selected.

If the eyes were directed to the menu item invoked by the user, control goes to step S65. If the user's eyes were on the selected menu item, the user 10 must still pay attention to the menus in order to select and execute the desired function, the user learning evaluation unit 13 therefore determines in step S65 that the user 10 is still learning the operation, and determines that the user 10 is not trained in the use of that function.

However, if the user's eyes were not focused on the menu item when the menu item was selected and invoked, control goes to step S66. In step S66, the user is quite familiar with the operation, can operate the device without paying much attention to the screen, and can access the desired function by simply repeating a rote operating sequence. The user learning evaluation unit 13 therefore decides that the user 10 is trained in the use of that function.

While this method of detecting where the user 10 is looking requires providing a means of detecting eye movement, this method enables directly determining if the user 10 can operate the device without looking at the menus.

Whether the user 10 reads the menus to access a desired function is determined in this third variation of the first embodiment from the history of eye movements detected by an eye movement detection means, but the invention is not so limited and the eye movement detection means can be omitted. For example, when a particular menu item has been invoked enough times that the user can be expected to have remembered that function, whether the user 10 still looks at the menu to select the function can be determined by changing the display position of the menu item and detecting if the time interval between operations changes. More specifically, if the menu display position changes or the alphanumeric label assigned to the menu item changes (such as changing [1] Inbox to [0] Inbox or [1] Send) but the operating time interval of user 10 operations remains the same, the user 10 is known to remembered the operation sufficiently to proceed without reading the displayed menu items.

Evaluating user learning can also use, for example, the final confirmation prompt (Send e-mail? [YES] [NO]) displayed when sending e-mail. If the user 10 is familiar with the operation of the final confirmation screen and tells the device to send a message, the user can immediately enter YES without reading the confirmation prompt. If the order of the controls is reversed to "Send e-mail? [NO] [YES]", for example, and the user responds in too short of a time to read the prompt, the user 10 is known to be responding without reading the confirmation prompt displayed on screen and can be determined to have learned that function.

When the displayed prompts and responses are changed, it may be necessary to add an error trapping routine to prevent operating errors or to change the prompt so that the wording changes but the operation remains the same. If only the wording is changed and the user is still at the stage of reading the prompts and menus, the user will notice the change in wording and require slightly longer to respond. As a result, whether the user has learned the operations for a particular function can also be determined by detecting if the user has noticed the change in display content.

Various methods can thus be used to determine if the user has remembered an operation, and these methods can be used separately or in combination. For example, if the keypad is used to directly access a function but the number of times the function has been accessed is still low, the user can be determined to still be learning the function. If the operating time interval is short and the interval between cursor movements is extremely short but the operating time interval immediately before pressing the Enter key is long, the user can be determined to be familiar with using the cursor but still not familiar with how to access the function. Such methods enable evaluating user learning based on a more accurate reflection of actual user behavior.

Second Embodiment of the Invention

The foregoing first embodiment of the invention is described using a cell phone by way of example, but the same process can be applied to other devices offering a plurality of functions. Other devices that select and execute menu items using vertical and horizontal cursor keys or a scroll wheel, for example, include televisions and video players that are operated using a remote control device to navigate through menus displayed on screen; car navigation systems that use a touch screen to navigate through numerous menus; and personal computer systems with a graphical user interface that is navigated using a mouse and keyboard.

This second embodiment of the invention describes a personal computer with a graphical user interface enabling the user to move the cursor with a mouse and invoke selected commands by clicking a button on the mouse.

A mouse is typically used on modern personal computer systems to move the cursor to select a desired function. After using the mouse to move the cursor to select a button, icon, or textual menu item presented on a screen making particular functions available, the user then clicks the mouse button to execute the action associated with the selected mouse, icon, or menu item. Similarly to repeating the same operation numerous times to remember a particular cell phone function as described above, the user gradually learns the operations required to invoke the desired function by repeatedly moving the cursor to navigate the buttons, icons, and menu items displayed on screen for selecting functions. This enables the user to move the cursor quickly to the desired screen location and press the mouse button to access a learned function. The user 10 remembers where the buttons, icons, and menu items for the desired function are located on screen together with the required mousing operations, and thus learns the specific sequence in which the specific buttons, icons, and menu items of the personal computer must be used.

If frequently used functions are assembled in one place in the manner of the adaptive input/output device of the related art, the two-dimensional locations of the buttons, icons, and menu items that the user has already remembered will all be changed and must be relearned by the user 10.

The present invention therefore does not change the location of buttons, icons, and menu items that the user 10 has already learned, and only moves the buttons, icons, and menu items that the user 10 has not yet remembered to a different location. In this second embodiment of the invention the user learning evaluation unit 13 determines if the user 10 has remembered each button, icon, and menu item, keeps those buttons, icons, and menu items that the user 10 has learned in the same two-dimensional location, and enables the system to adjust the two-dimensional positions of the buttons, icons, and menu items that the user 10 has not learned to assist the user 10. This enables the system to adjust the display position of certain controls while not interfering with the user's learning process, and thus enables the user 10 to operate the system efficiently.

This second embodiment of the invention is described using a mouse to select functions, but the invention can be used in any device where the icons are associated with a particular display position even if a cursor is not used to select the icons. The functions of a car navigation system, for example, are typically accessed using a touch panel so that the user simply points to the desired icon and touches the screen where the icon is displayed with his finger. If the icons are moved by the system adapting to the user, the user may move his finger to the expected position of the icon but then have to look for the icon because it has been moved and is not in the expected location. This interferes with smooth operation. It is therefore preferable to not move any icon, for example, associated with a function that the user has learned and associates with controls displayed in certain positions. This also applies to other devices that are operated with a touch panel screen, including PDAs and cell phones.

This second embodiment of the invention leaves the buttons, icons, and menu items that the user 10 has already learned in the same two-dimensional location, but the invention is not so limited. Items can also be left at the same level in a hierarchical menu system, for example. Functions are often located on a hierarchical menu below the top level so that the function name is not initially displayed. In this case the user 10 does not remember where the function is displayed on screen, but instead remembers the sequence of menus that must be navigated to reach the desired function, that is, remembers the location of the function within the menu structure. Buttons, icons, and menu items that the user 10 has already learned are left at the same location in the menu structure, but buttons, icons, and menu items that the user 10 has not learned can be moved by the system to a different location within the menu structure. This enables adapting where functions are displayed without interfering with user 10 learning.

INDUSTRIAL APPLICABILITY

An input/output device according to the present invention is useful for adjusting the display positions of the functions of a device that has numerous functions that are selected and executed by using vertical and horizontal cursor control keys, a cursor scroll wheel, or a mouse, for example.

What is claimed is:

1. An input/output device for selecting an item displayed on screen through a sequence of operations and then executing a function corresponding to the selected item, comprising:
   input means, to be operated by a user, for inputting user operations;
   storage means for storing an input operation history of user operations input to the input means;
   display position adjusting means for adjusting screen display positions of items based on the input operation history stored in the storage means;
   output means for outputting the items to the screen display positions adjusted by the display position adjusting means; and
   user learning evaluation means for determining if the user has learned the selection sequence for items selected by the user based on the input operation history stored in the storage means;
   wherein the display position adjusting means prohibits changing the screen display position of items that the user learning evaluation means determines the user has learned, and adjusts the display position of items that the user learning evaluation means determines the user has not learned; and
   wherein the user learning evaluation means detects from the input operation history stored in the storage means the type of buttons used to execute a function, determines that the user has learned any item for which the detected buttons include a numeric button, and determines that the user has not learned any item for which the detected buttons include the enter button.

2. An input/output device for selecting an item displayed on screen through a sequence of operations and then executing a function corresponding to the selected item, comprising:
   input means, to be operated by a user, for inputting user operations;
   storage means for storing an input operation history of user operations input to the input means;
   display position adjusting means for adjusting screen display positions of items based on the input operation history stored in the storage means;
   output means for outputting the items to the screen display positions adjusted by the display position adjusting means; and user learning evaluation means for determining if the user has learned the selection sequence for items selected by the user based on the input operation history stored in the storage means;

wherein the display position adjusting means prohibits changing the screen display position of items that the user learning evaluation means determines the user has learned, and adjusts the display position of items that the user learning evaluation means determines the user has not learned; and wherein the user learning evaluation means calculates a display screen switching interval from the input operation history stored in the storage means, determines that the user has learned any item for which the calculated display screen switching interval is less than a reference value, and determines that the user has not learned any item for which the display screen switching interval is greater than or equal to the reference value.

3. An input/output device for selecting an item displayed on screen through a sequence of operations and then executing a function corresponding to the selected item, comprising:

input means, to be operated by a user, for inputting user operations;

storage means for storing an input operation history of user operations input to the input means;

display position adjusting means for adjusting screen display positions of items based on the input operation history stored in the storage means;

output means for outputting the items to the screen display positions adjusted by the display position adjusting means; and user learning evaluation means for determining if the user has learned the selection sequence for items selected by the user based on the input operation history stored in the storage means;

wherein the display position adjusting means prohibits changing the screen display position of items that the user learning evaluation means determines the user has learned, and adjusts the display position of items that the user learning evaluation means determines the user has not learned;

wherein the user learning evaluation means calculates an operating time interval from the input operation history stored in the storage means, determines that the user has learned any item for which the calculated operating time interval is less than a reference value, and determines that the user has not learned any item for which the operating time interval is greater than or equal to the reference value; and wherein the user learning evaluation means adjusts the reference value according to the length of a message displayed on screen.

4. An input/output device for selecting an item displayed on screen through a sequence of operations and then executing a function corresponding to the selected item, comprising:

input means, to be operated by a user, for inputting user operations;

storage means for storing an input operation history of user operations input to the input means;

display position adjusting means for adjusting screen display positions of items based on the input operation history stored in the storage means;

output means for outputting the items to the screen display positions adjusted by the display position adjusting means; and user learning evaluation means for determining if the user has learned the selection sequence for items selected by the user based on the input operation history stored in the storage means;

wherein the display position adjusting means prohibits changing the screen display position of items that the user learning evaluation means determines the user has learned, and adjusts the display position of items that the user learning evaluation means determines the user has not learned; and wherein the user learning evaluation means detects where the user is looking, determines that the user has not learned any item the user selects by looking at the screen, and determines that the user has learned any item the user selects by not looking at the screen.

5. An input/output device for selecting an item displayed on screen through a sequence of operations and then executing a function corresponding to the selected item, comprising:

input means, to be operated by a user, for inputting user operations;

storage means for storing an input operation history of user operations input to the input means;

display position adjusting means for adjusting screen display positions of items based on the input operation history stored in the storage means;

output means for outputting the items to the screen display positions adjusted by the display position adjusting means; and user learning evaluation means for determining if the user has learned the selection sequence for items selected by the user based on the input operation history stored in the storage means;

wherein the display position adjusting means prohibits changing the screen display position of items that the user learning evaluation means determines the user has learned, and adjusts the display position of items that the user learning evaluation means determines the user has not learned; and wherein the user learning evaluation means determines that the user has not learned items for which the user's actions change when the screen display is changed, and determines that the user has learned items for which the user's actions did not change.

6. A non-transitory computer readable storage medium for causing a computer to execute an input/output method for selecting an item displayed on screen through a sequence of operations and then executing a function corresponding to the selected item, the method comprising:

inputting user operations;

storing an input operation history of inputted user operations;

adjusting screen display positions of items based on the stored input operation history;

outputting the items to the adjusted screen display positions;

determining if the user has learned the selection sequence for items selected by the user based on the stored input operation history;

prohibiting changing the screen display position of items that said determining determines the user has learned, and adjusting the display position of items that determining determines the user has not learned; and detecting from the stored input operation history the type of buttons used to execute a function, determining that the user has learned any item for which the detected buttons include a numeric button, and determining that the user has not learned any item for which the detected buttons include the enter button.

7. A non-transitory computer readable storage medium for causing a computer to execute an input/output method for selecting an item displayed on screen through a sequence of operations and then executing a function corresponding to the selected item, the method comprising:
inputting user operations;
storing an input operation history of inputted user operations;
adjusting screen display positions of items based on the stored input operation history;
outputting the items to the adjusted screen display positions;
determining if the user has learned the selection sequence for items selected by the user based on the stored input operation history;
prohibiting changing the screen display position of items that said determining determines the user has learned, and adjusting the display position of items that determining determines the user has not learned; and
calculating a display screen switching interval from the stored input operation history, determining that the user has learned any item for which the calculated display screen switching interval is less than a reference value, and determining that the user has not learned any item for which the display screen switching interval is greater than or equal to the reference value.

8. A non-transitory computer readable storage medium for causing a computer to execute an input/output method for selecting an item displayed on screen through a sequence of operations and then executing a function corresponding to the selected item, the method comprising:
inputting user operations;
storing an input operation history of inputted user operations;
adjusting screen display positions of items based on the stored input operation history;
outputting the items to the adjusted screen display positions;
determining if the user has learned the selection sequence for items selected by the user based on the stored input operation history;
prohibiting changing the screen display position of items that said determining determines the user has learned, and adjusting the display position of items that determining determines the user has not learned;
calculating an operating time interval from the stored input operation history, determining that the user has learned any item for which the calculated operating time interval is less than a reference value, and determining that the user has not learned any item for which the operating time interval is greater than or equal to the reference value; and
adjusting the reference value according to the length of a message displayed on screen.

9. A non-transitory computer readable storage medium for causing a computer to execute an input/output method for selecting an item displayed on screen through a sequence of operations and then executing a function corresponding to the selected item, the method comprising:
inputting user operations;
storing an input operation history of inputted user operations;
adjusting screen display positions of items based on the stored input operation history;
outputting the items to the adjusted screen display positions;
determining if the user has learned the selection sequence for items selected by the user based on the stored input operation history;
prohibiting changing the screen display position of items that said determining determines the user has learned, and adjusting the display position of items that determining determines the user has not learned; and
detecting where the user is looking, determining that the user has not learned any item the user selects by looking at the screen, and determining that the user has learned any item the user selects by not looking at the screen.

10. A non-transitory computer readable storage medium for causing a computer to execute an input/output method for selecting an item displayed on screen through a sequence of operations and then executing a function corresponding to the selected item, the method comprising:
inputting user operations;
storing, in a memory device, an input operation history of inputted user operations;
adjusting screen display positions of items based on the stored input operation history;
outputting the items to the adjusted screen display positions;
determining if the user has learned the selection sequence for items selected by the user based on the stored input operation history;
prohibiting changing the screen display position of items that said determining determines the user has learned, and adjusting the display position of items that determining determines the user has not learned; and
determining that the user has not learned items for which the user's actions change when the screen display is changed, and determining that the user has learned items for which the user's actions did not change.

* * * * *

UNITED STATES PATENT AND TRADEMARK OFFICE
CERTIFICATE OF CORRECTION

PATENT NO. : 7,865,841 B2  Page 1 of 1
APPLICATION NO. : 11/794395
DATED : January 4, 2011
INVENTOR(S) : Koji Morikawa It is certified that error appears in the above-identified patent and that said Letters Patent is hereby corrected as shown below:

Title Page;
In Item 86, "PCT No.:" "PCT/JP2006/022841" should read --PCT/JP2006/322841--.

Signed and Sealed this
Fifth Day of April, 2011

David J. Kappos
*Director of the United States Patent and Trademark Office*